US 6,712,666 B2

(12) United States Patent
Wu

(10) Patent No.: US 6,712,666 B2
(45) Date of Patent: Mar. 30, 2004

(54) FABRICATION METHOD OF FLAT PANEL DISPLAY COMPRISING ADDRESS LINE WITH MENDING LAYER

(75) Inventor: Biing-Seng Wu, Tainan (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 0 days.

(21) Appl. No.: 10/310,589

(22) Filed: Dec. 4, 2002

(65) Prior Publication Data

US 2003/0077973 A1 Apr. 24, 2003

Related U.S. Application Data

(62) Division of application No. 09/767,340, filed on Jan. 23, 2001, now Pat. No. 6,515,301.

(30) Foreign Application Priority Data

Sep. 13, 2000 (TW) ........................................ 89118679 A

(51) Int. Cl.[7] ................. H01J 9/00; H01J 9/50
(52) U.S. Cl. ..................... 445/24; 445/2; 445/25; 257/72; 349/54
(58) Field of Search ................. 29/592.1, 825; 445/24, 25, 2; 313/495, 496, 497; 257/72; 349/54

(56) References Cited

U.S. PATENT DOCUMENTS 5,995,178 A * 11/1999 Fujikawa et al. ............ 349/55
6,259,494 B1 * 7/2001 Kawai et al. ................ 349/39

* cited by examiner

Primary Examiner—Kenneth J. Ramsey
Assistant Examiner—Mariceli Santiago
(74) Attorney, Agent, or Firm—J.C. Patents

(57) ABSTRACT

A structure and a fabrication method of a flat panel display comprising address lines with mending layers. A first address line and a first mending layer are formed on a substrate. The first mending layer and the first address line are electrically insulated with each other, and the first mending layer is partitioned into different segments by the first address line. A first insulating layer is formed over the substrate to cover at least the first mending layer and the first address line. A second address line is formed on the first insulating layer over the first mending layer and crossing the first address line. A second insulating layer is formed over the substrate to cover at least the second address line. A second mending layer is formed on the second insulating layer over the second address line and crossing the first address line.

11 Claims, 6 Drawing Sheets

FABRICATION METHOD OF FLAT PANEL DISPLAY COMPRISING ADDRESS LINE WITH MENDING LAYER

CROSS-REFERENCE TO RELATED APPLICATION

This application is a divisional application of, and claims the priority benefit of, U.S. application Ser. No. 09/767,340 filed on Jan. 23, 2001, now U.S. Pat. No. 6,515,301.

BACKGROUND OF THE INVENTION

1. Field of the Invention

The invention relates in general to a structure and a fabrication method of a flat panel display comprising address lines. More particularly, this invention relates to a structure and a fabrication method of a flat panel display comprising address lines having mending layers.

2. Description of the Related Art

In the operation of a flat panel display, two orthogonal address lines, namely, scan lines and data lines, are used to control the pixels arranged in a matrix for image display. The scan lines and the data lines are perpendicular to each other. Each intersection of the scan lines and the data lines is located near by a pixel. During the operation of the flat panel display, each scan line is driven sequentially, and the status of each corresponding pixel, that is, the image shown on the flat panel display, is changed according to the transmission signal from each data line.

The scan lines and data lines have to be long enough to cross the whole display area of the flat panel display device. Due to certain amount of inevitable defects or contamination, defective scan lines or data lines are often found on the substrate. As a consequence, pixels connected to those defective lines could not receive data signal sand display properly. Accordingly, some mending methods are proposed.

For example, when one of the data lines is broken, a metal line deposited around the display area is welded and electrically connected with the two terminals of the broken data line. Accordingly, all pixels along the broken data line receive data signal at the same time from both terminals. However, this method might induce higer stray capacitance and resistance As a result, pixels connected with the broken data line would abnormally operat. That is, the overall image quality of the flat panel display is degraded. In addition, if a defect happens to a scan line and mended by the above-mentioned method, high stray capacitance would also cause a serious RC delay for the scan line. The RC delay would distort scan voltage waveform along the scan line result in a weak line.

SUMMARY OF THE INVENTION

The present invention provides a method of fabricating an address line having a mending layer on a flat panel display. A substrate is provided. A first address line and a first mending layer are formed on the substrate. The first mending layer is electrically insulated from the first address line. The first mending layer is partitioned into different segments by the first address line. A first insulating layer is formed over the substrate to cover at least the first address line and the first mending layer. A second address line is formed on the first insulating layer over the first mending layer and crosses the first address line. A second insulating layer is formed over the substrate to cover at least the second address line. A second mending layer is formed on the second insulating layer over the second address line and crosses the first address line. Preferably, a coverage of the second mending layer is partly overlapped with the first mending layer at two sides of the first address line. Besides, it is preferable that the material for forming the first address line and the first mending layer is the same, and the first address line and the first mending layer are formed simultaneously.

In the above method, a third mending layer can further be formed over the first address line while forming the second address line. The third mending layer is electrically insulated from the second address line.

The present invention further provides a structure of an address line having a mending layer on a flat panel display. The structure comprises a first address line, a first mending layer, a first insulating layer, a second address line, a second insulating layer and a second mending layer. The first address line and the first mending layer are electrically insulated from each other and formed on an insulating substrate. The first mending layer is partitioned into different segments by the first address line. The first insulating layer covers at least the first address line and the first mending layer. The second address line is located on the first insulating layer over the mending layer and crosses the first address line. The second insulating layer covers at least the second address line. The second mending layer is located on the second insulating layer over the second address line and crosses the first address line.

The above structure further comprises a third mending layer located on the first insulating layer over the first address line and electrically insulated from the second address line.

In addition, in the above method and structure, the first address line includes a scan line and the second address line includes a data line. It is preferable that the second mending layer is made of a material similar to that of the pixel on the flat panel display. The second mending layer can be formed simultaneously with the pixel to simplify the fabrication process.

The address line having a mending layer can solve the problem of broken line on a flat panel display. As mentioned above, the first mending layer is formed under the data line in a flat panel display. When a defective point happens to the data line, the first mending layer located below the defective point is laserwelded and connected electrically with the data line. The data line is thus mended with the first mending layer. In specific case, when the defective point is located on the intersection portion of the data line over the scan line, the second mending layer is welded and electrically connected with two ends of the data line. Therefore, with the coverage of the second mending layer partly overlapping the coverage of the first mending layer on both sides of the first address line, no matter where the defective point is located on the data line, it can be easily repaired.

In addition, the third mending layer can be further formed over the scan line. Therefore, when a defective point happens to the scan line, the third mending layer can be welded and electrically connected with the broken scan line.

The first mending layer can be used to mend the broken data line thereon, the second mending layer is used to mend the broken part of the data line located at an intersection between the data line and the scan line, and the third mending layer is used to mend the underlying broken scan line. Therefore, without external bonding or wiring, the broken address lines (the data line and the scan line) can be mended to ensure a normal operation of every single pixel. The yield is thus greatly improved.

Both the foregoing general description and the following detailed description are exemplary and explanatory only and are not restrictive of the invention, as claimed.

DESCRIPTION OF THE PREFERRED EMBODIMENTS

Figure 1A:
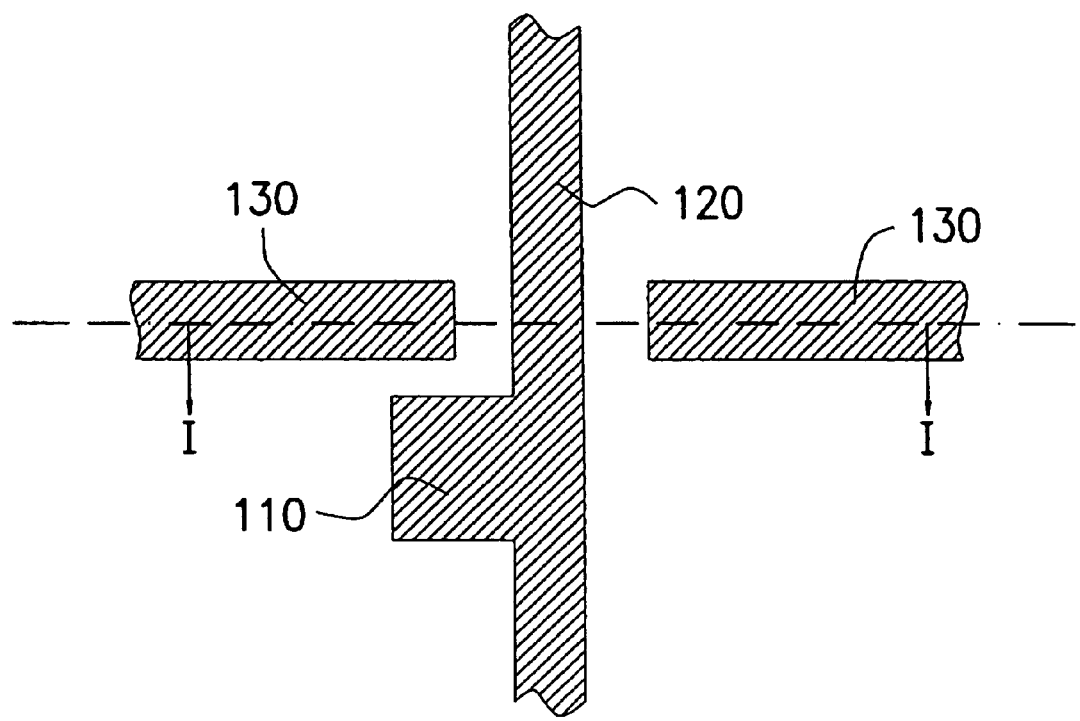
FIGS. 1A, 2A, 3A and 4A are top views showing a structure and fabrication process of address lines having mending layers of a thin film transistor (TFT) liquid crystal display.
Figure 1B:
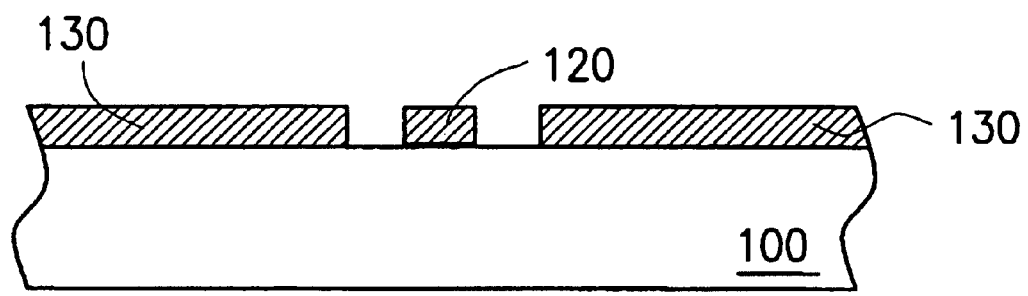
FIGS. 1B and 2B are cross sectional views along the line I—I in FIGS. 1A and 2A, respectively.

Referring to FIGS. 1A and 1B, a substrate 100, for example, an insulating substrate, is provided. Using metal deposition and photolithography and etching processes, a gate 110, a scan line 120 connected to the gate 110 and a mending layer 130 are formed on the substrate 100. The mending layer 130 and the scan line 120 are electrically insulated from each other. The mending layer 130 is further partitioned into different sections by the scan line 120. The material for forming the gate 110, the scan line 120 and the mending layer 130 are similar. Furthermore, the gate 110, the scan line 120 and the mending layer 130 can be formed simultaneously to simplify the fabrication process.

Referring to FIGS. 2A to 2D, an insulating layer 135 is formed over the substrate 100 to cover at least the scan line 120 and the mending layer 130. In this embodiment, the gate 110 is also covered with the insulating layer 135. The portion of the insulating layer 135 covering the gate 110 is to be formed as the gate insulating layer in a thin film transistor. The material of the insulating layer 135 includes, for example, silicon nitride.

Figure 2A:
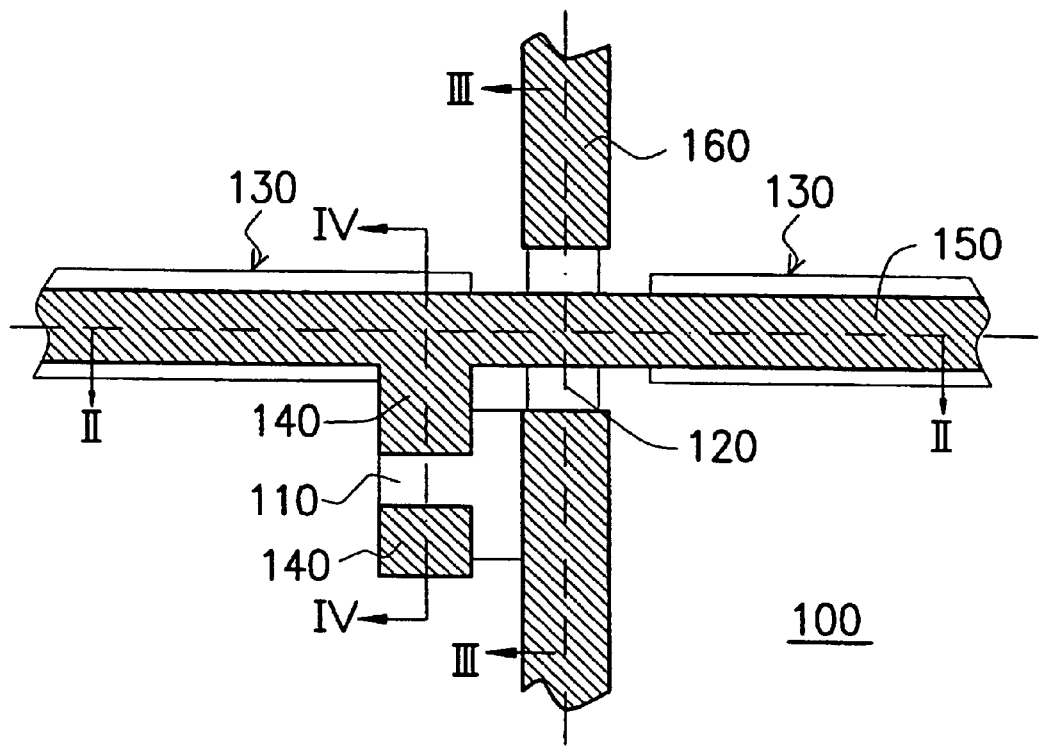
Figure 2B:
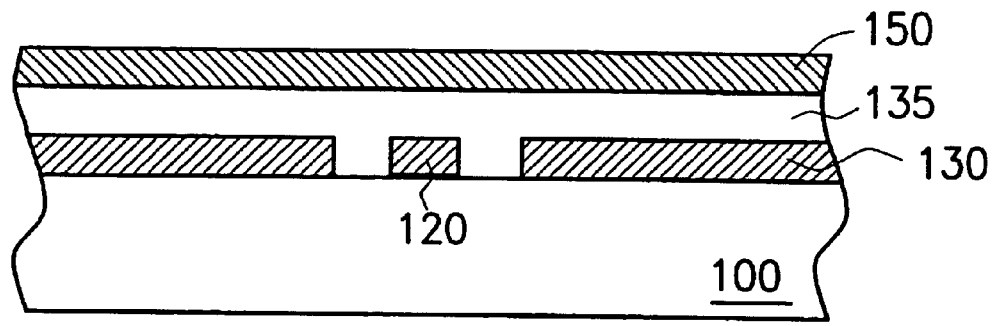
Figure 2C:
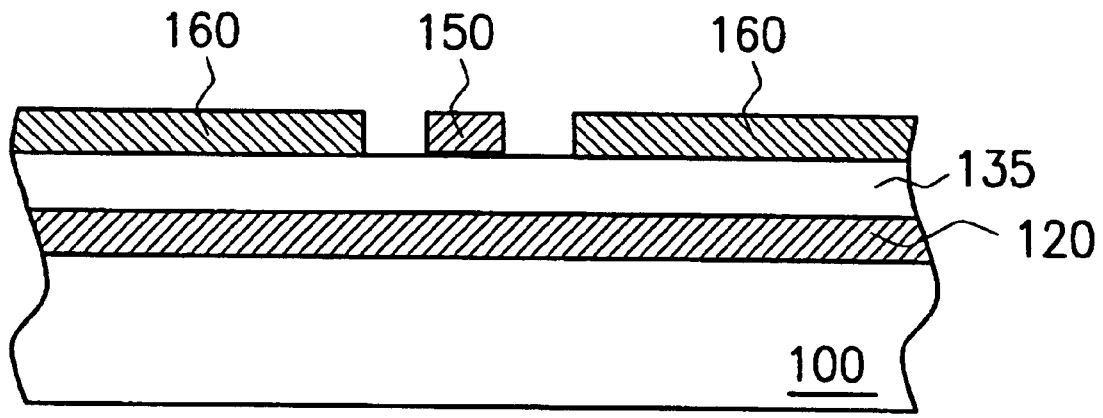
FIG. 2C is a cross sectional view along the line III—III in FIG. 2A.
Figure 2D:
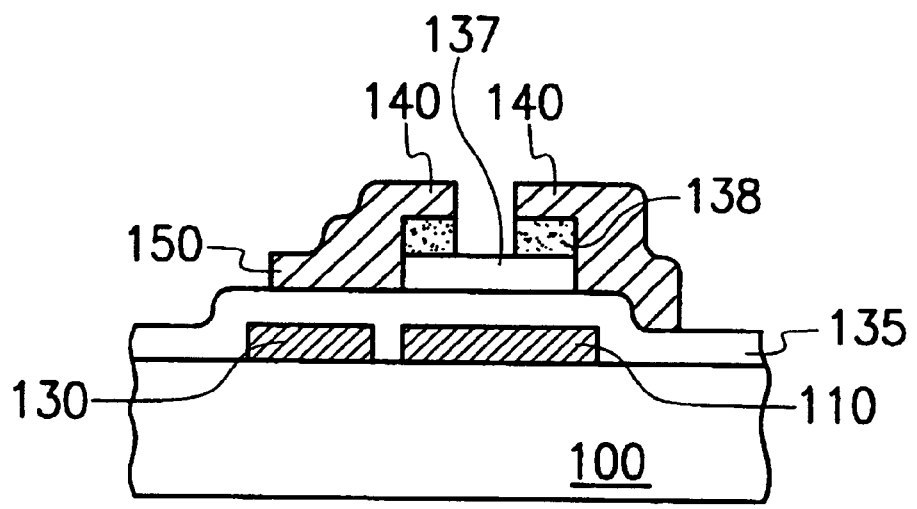
FIG. 2D is a cross sectional view of FIG. 2A along the line IV—IV.

In FIG. 2D, a channel layer 137 is formed on the portion of the insulating layer 135 that covers the gate 110. A heavily doped semiconductor layer 138 is further formed on the channel layer 137. As shown in FIGS. 2A to 2D, a data line 150 is then formed on the insulating layer 135. A portion of the data line located on the heavily doped semiconductor layer 138, denoted as 140, is the source/drain conducting layer 140. Meanwhile, a mending layer 160 is also formed on the insulating layer 135 aligned over the scan line 120. The data line 150 is formed aligned over the mending layer 130 and crossing the scan line 120. The mending layer 160 is electrically insulated from the data line 150, and the mending layer 160 can be partitioned into different sections by the data line 150, as shown in FIGS. 2A and 2C.

Figure 3A:
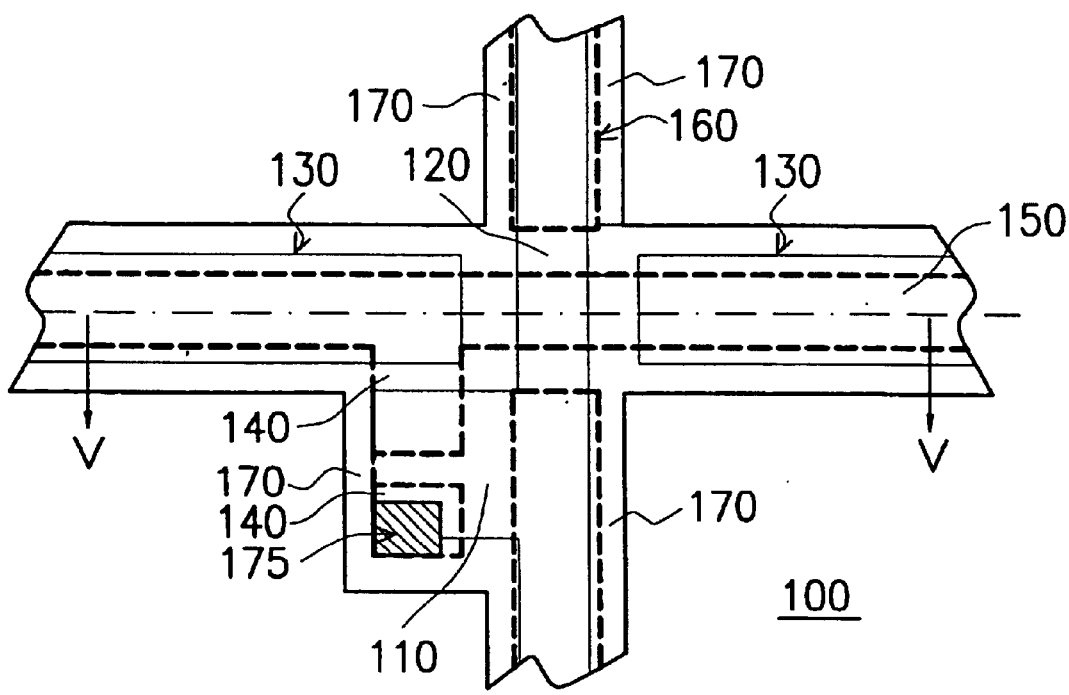
Figure 3B:
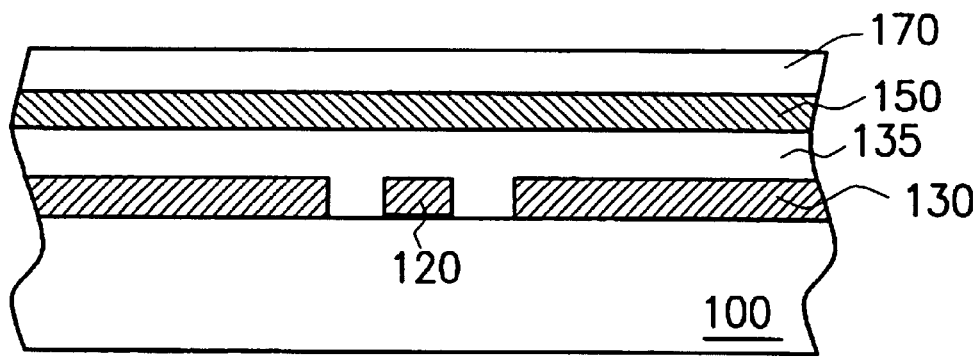
FIG. 3B is a cross sectional view along the line V—V in FIG. 3A.

Referring to FIGS. 3A and 3B, a patterned passivation layer 170 is formed to cover the data line 170, the mending layer 160, the source/drain conducting layer 140 and the peripheral regions thereof. The passivation layer 170 comprises an opening 170 to expose a part of the source/drain conducting layer 140 to provide an electrical connection between the source/drain conducting layer 140 and the pixel electrodes formed subsequently.

Figure 4A:
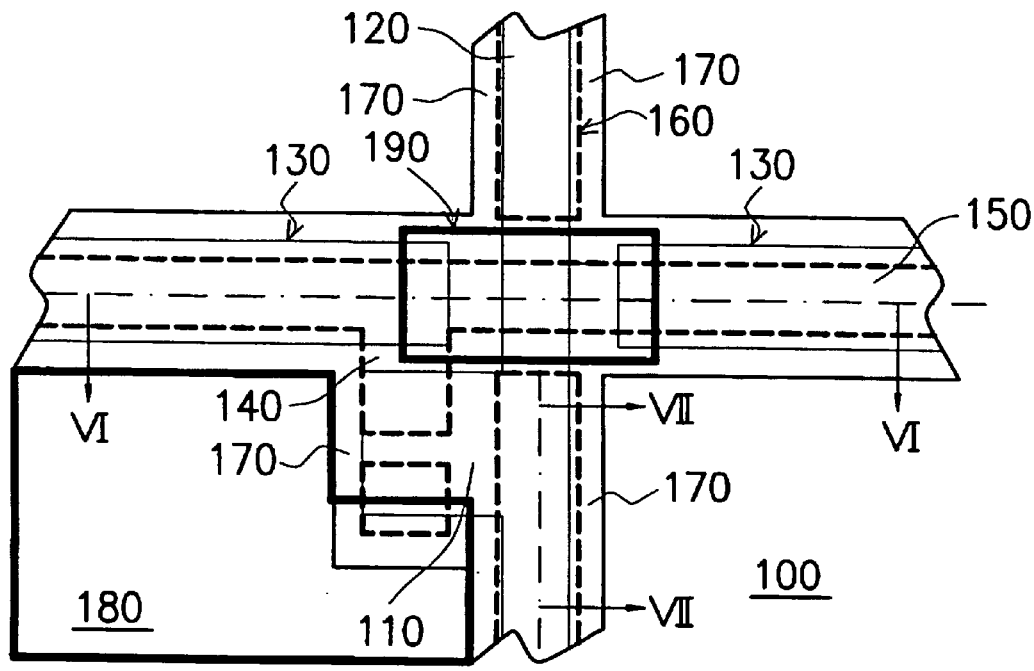
Figure 4B:
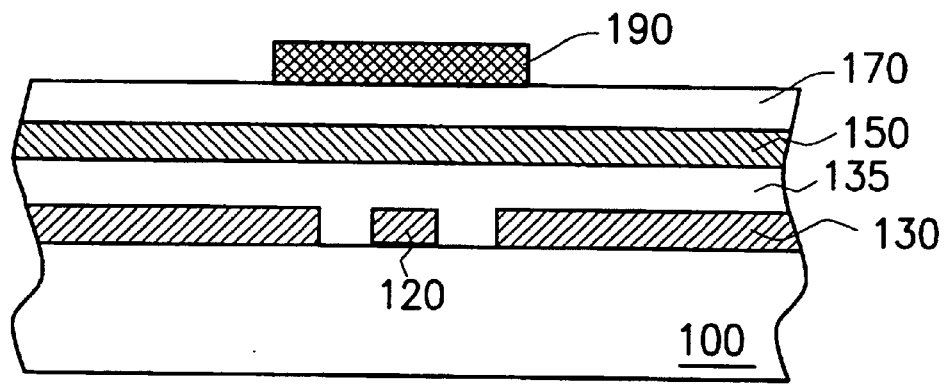
FIG. 4B is a cross sectional view along the line VI—VI in FIG. 4A.

As shown in FIGS. 4A and 4B, a mending layer 190 is formed on the passivation layer 170, and a pixel electrode 180 is formed to electrically connect the source/drain conducting layer 140. The mending layer 190 is aligned over the data line 150 and across the scan line 120. Preferably, the mending layer 190 and the pixel electrode 180 are formed of the same material, for example, indium tin oxide (ITO) simultaneously.

Figure 4C:
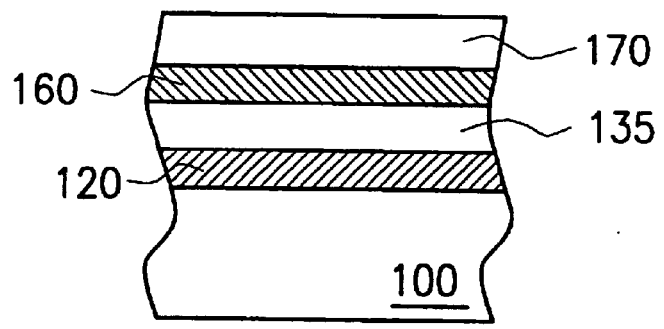
FIG. 4C is a cross sectional view along the line VII—VII in FIG. 4A.

Referring to FIGS. 4A to 4C, after the above processes, in the thin film transistor liquid crystal display, the address lines include the data line 150 and the scan line 120 and the mending layers 130, 160 and 190. In addition, the thin film transistor liquid display further includes the substrate 100, the gate 110, the insulating layers 135, the channel layer 137, the heavily doped semiconductor layer 138, the source/drain conducting layer 140, the passivation layer 170 and the pixel electrode 180.

The above scan line 120, gate 110 and mending layer 130 are formed on the substrate 100. The mending layer 130 and the scan line 120 are electrically insulated from each other. The mending layer 130 is further partitioned into different sections by the scan line 120. The insulating layer 130 is located on the scan line 120, the mending layer 130 and the gate 110. The channel layer 137 is located on the insulating layer 135 aligned over the gate 110. The heavily doped semiconductor layer 138 is located on the channel layer 137. The data line 150 is located on the insulating layer 130 aligned over the mending layer 130 crossing the scan line 120. The source/drain conducting layer 140 is formed on the heavily doped semiconductor layer 138. The mending layer 160 is located on the insulating layer 135 aligned over the scan line 120 and is electrically insulated from the data line 150. The passivation layer 170 is located on the source/drain conducting layer 140, the data line 150 and the mending layer 160. The pixel electrode 180 penetrates through the passivation layer 170 to electrically connect the source/drain conducting layer 140. The mending layer 190 is located on the passivation layer 170 aligned over the data line 150 crossing the scan line 120.

In the above structure, the mending layer 160 can be made of a material for forming the data line 150 and the source/drain conducting layer 140. The material for forming the mending layer 130 is the same as those for forming the scan line and the gate 110. The materials for forming the mending layer 190 and the pixel electrodes are, for example, indium tin oxide. In addition, preferably, the coverage of the mending layer 130 and the coverage of the mending layer 130 partly overlap with each other to ensure every portion of the data line 150 can be mended as required.

Figure 5:
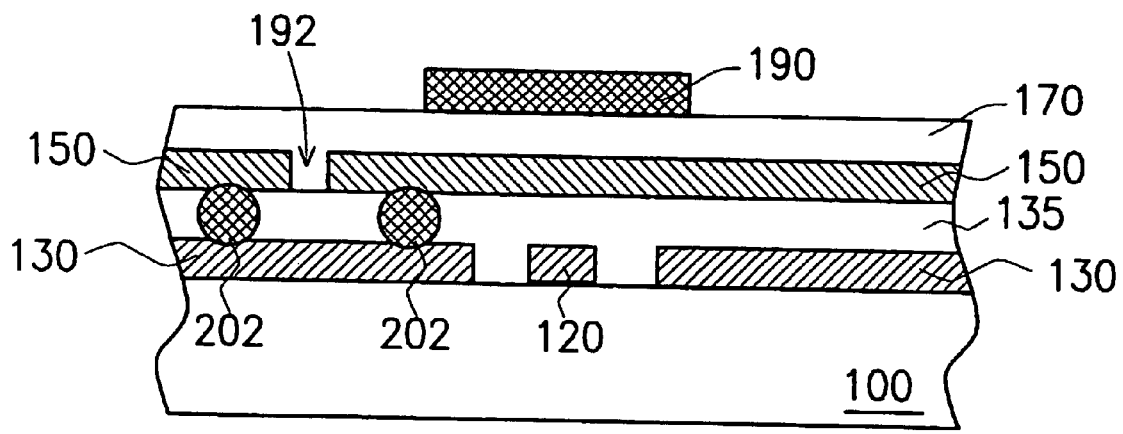
FIGS. 5–7 shows the mending condition when the address lines of thin-film transistor liquid crystal display are broken.

In FIG. 5, as a mending layer 130 is formed under the data line 150, when the data line 150 is broken, the broken part 190 of the data line 150 can be mended by laser welding and electrically connecting the data line 150 on both sides of the broken part 190 with the mending layer 130. In other words, by melting portions of the data line 150, the insulating layer 135 and the mending layer 130, two conductive material 202 are formed between the mending layer 130 and the data line 150. Therefore, two broken parts of data line 150 are electrically connected with each other.

Figure 6:
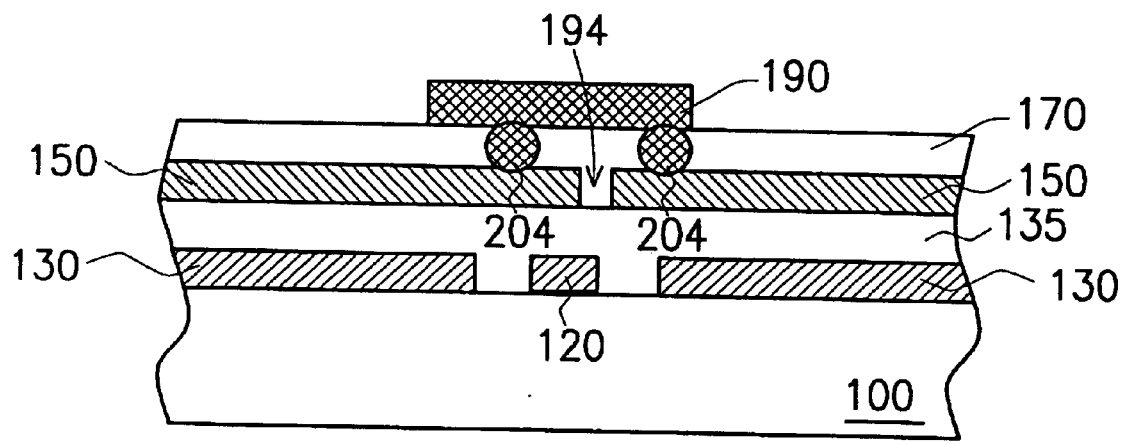

In FIG. 6, as the mending layer 190 is formed across the scan line 120, when the data line 150 across the scan line 120 is broken, the data line 150 can be electrically connected again by laser welding the mending layer 190 and the data line 150. That is, portions of the mending layer 190, the passivation layer 170 and the data line 150 are melted to electrically connect the broken parts of the data lines 150 via two conducting blocks 204 between the mending layer 190 and the data line 150 in the passivation layer 170. Therefore, as the coverage of the mending layer 190 and the coverage of the scan line 120 partly overlap with each other, it is ensured that no matter where the broken part occurs, the data line 150 can be mended.

Figure 7:
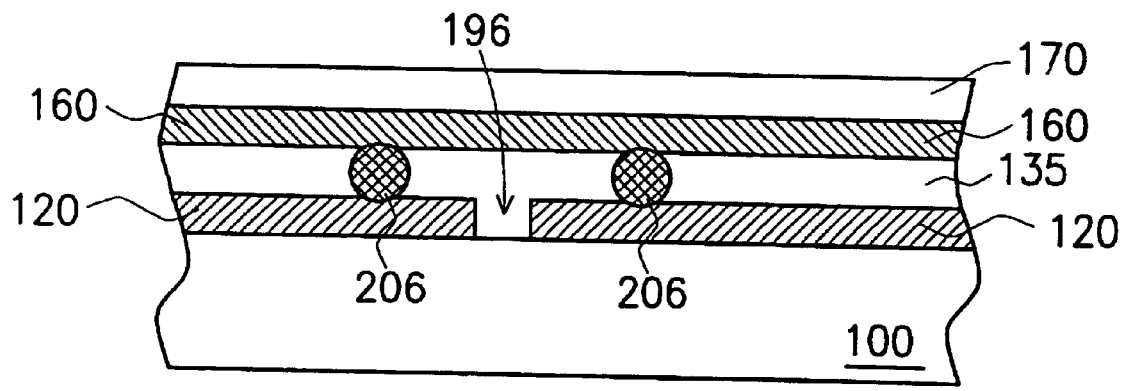

In FIG. 7, the mending layer 160 is formed over the scan line 120. When the scan line 120 is broken, the scan line 120 at the two sides of the broken part 196 can be electrically connected again by laser welding the scan line 120, the insulating layer 135 and the mending layer 160 into two conductive blocks 206. Each side of the scan line 120 is thus connected with the mending layer 160 via each of the conductive blocks 206.

As mentioned above, the mending layer 130 under the data line 150 can be used to mend the broken data line 150. The mending layer 190 over the data line 150 can be used to mend the data line 150 over the scan line 120, and the mending layer 160 can be used to mend the broken scan line 120. Therefore, instead of using the conventional bonding or wiring via external metal line, the broken data line and scan line can be mended to maintain a normal operation of the pixels. The display quality of the display can be improved, and the products that comprise such defects can be mended easily.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for fabricating a flat panel display comprising address lines with mending layers on a substrate, the method comprising:
   forming a first address line and a first mending layer on the substrate, wherein the first address line and the first mending layer are electrically insulated from each other, and the first mending layer is partitioned into different segments by the first address line;
   forming a first insulating layer over the substrate to cover at least the first address line and the first mending layer;
   forming a second address line on the first insulating layer substantially over the first mending layer and across the first address line;
   forming a second insulating layer over the substrate to cover at least the second address line; and
   forming a second mending layer on the second insulating layer substantially aver the second address line and across the first address line.

2. The method according to claim 1, wherein the step of forming the second address line further comprises simultaneously forming a third mending layer on the first insulating layer substantially over the first address line, the third mending layer being electrically insulated from and partitioned into different segments by the second address line.

3. The method according to claim 1, wherein the step of forming the second mending layer comprising a step of forming the second mending layer with a coverage partly overlapping a coverage of the first mending layer at the two sides of the first address line.

4. The method according to claim 1, wherein the step of forming the first address line and the first mending layer comprises a step of forming the first address line and the first mending layer simultaneously.

5. The method according to claim 1, wherein the step of forming the second mending layer further comprises simultaneously forming a pixel electrode with a same material as the second mending layer.

6. A method of fabricating a thin film transistor liquid crystal display comprising address lines with mending layers, the method comprising:
   forming a scan line, a gate and a first mending layer on a substrate, wherein the first mending layer is electrically insulated from the scan line and is partitioned into different segments by the scan line;
   forming an insulating layer over the substrate to cover at least the scan line, the gate and the first mending layer;
   forming a channel layer on the insulating layer over the gate;
   forming a heavily doped semiconductor layer on the channel layer;
   forming a data line on the insulating layer substantially over the first mending layer and crossing the scan line, wherein a portion of the data line formed over the heavily doped semiconductor layer as a source/drain conducting layer;
   forming a passivation layer over the substrate to cover at least the data line and a portion of the source/drain conducting layer, while the other portion of the source/drain conducting layer is exposed by an opening in the passivation layer; and
   forming a second mending layer on the passivation layer substantially over the data line and a pixel electrode to connect the exposed source/drain conducting layer, wherein the second mending layer crosses the scan line.

7. The method according to claim 6, wherein the step of forming the data line further comprising simultaneously forming a third mending layer on the insulating layer substantially over the scan line, the third mending layer being electrically insulated from the data line and partitioned into different segments by the data line.

8. The method according to claim 6, wherein the step of forming the second mending layer comprises forming the second mending layer with a coverage partly overlapping with a coverage of the first mending layer at the two sides of the scan line.

9. The method according to claim 6, wherein the step of forming the gate, the scan line and the first mending layer comprises simultaneously forming the gate, the scan line and the first mending layer with an identical material.

10. The method according to claim 6, wherein the step of forming the second mending layer and the pixel electrode comprises a step of simultaneously forming the second layer and the pixel electrode with an identical material.

11. The method according to claim 6, wherein the step of forming the second mending layer and the pixel electrode comprising forming the second mending layer and the pixel electrode with indium tin oxide.

* * * * *